Jan. 24, 1956 J. SLUIJTERS 2,732,143

MECHANISM FOR AN ELECTROMAGNETIC SOUND RECORDING AND REPRODUCING APPARATUS

Filed June 27, 1951 2 Sheets-Sheet 1

INVENTOR:
JAN SLUIJTERS
BY:
Michael S. Striker
agt.

INVENTOR:
JAN SLUIJTERS
BY:
Michael S. Striker
agt.

United States Patent Office 2,732,143

Patented Jan. 24, 1956

2,732,143

MECHANISM FOR AN ELECTROMAGNETIC SOUND RECORDING AND REPRODUCING APPARATUS

Jan Sluijters, Loenersloot, Netherlands, assignor to Technische Import-Export en Fabricage "Amroh," Herengracht, Muiden, Netherlands Application June 27, 1951, Serial No. 233,740

Claims priority, application Netherlands July 1, 1950

2 Claims. (Cl. 242—54)

My present invention relates to a mechanism for an electromagnetic sound recording and reproducing apparatus which is also adapted for the spooling back of the magnetic recording wire or tape and is provided with a separate driving motor for either direction of rotation and also with an electromagnetic disengaging device for the driving gear between a motor and the rest of the system.

In this type of apparatus the driving mechanism between the motor driving and the take-up-reel is used as a brake when after spooling back the rotation of the take-up-reel is to be reversed. One object of my invention is to avoid the possibility of an excessive stress on the wire during the braking process.

Figure 1:
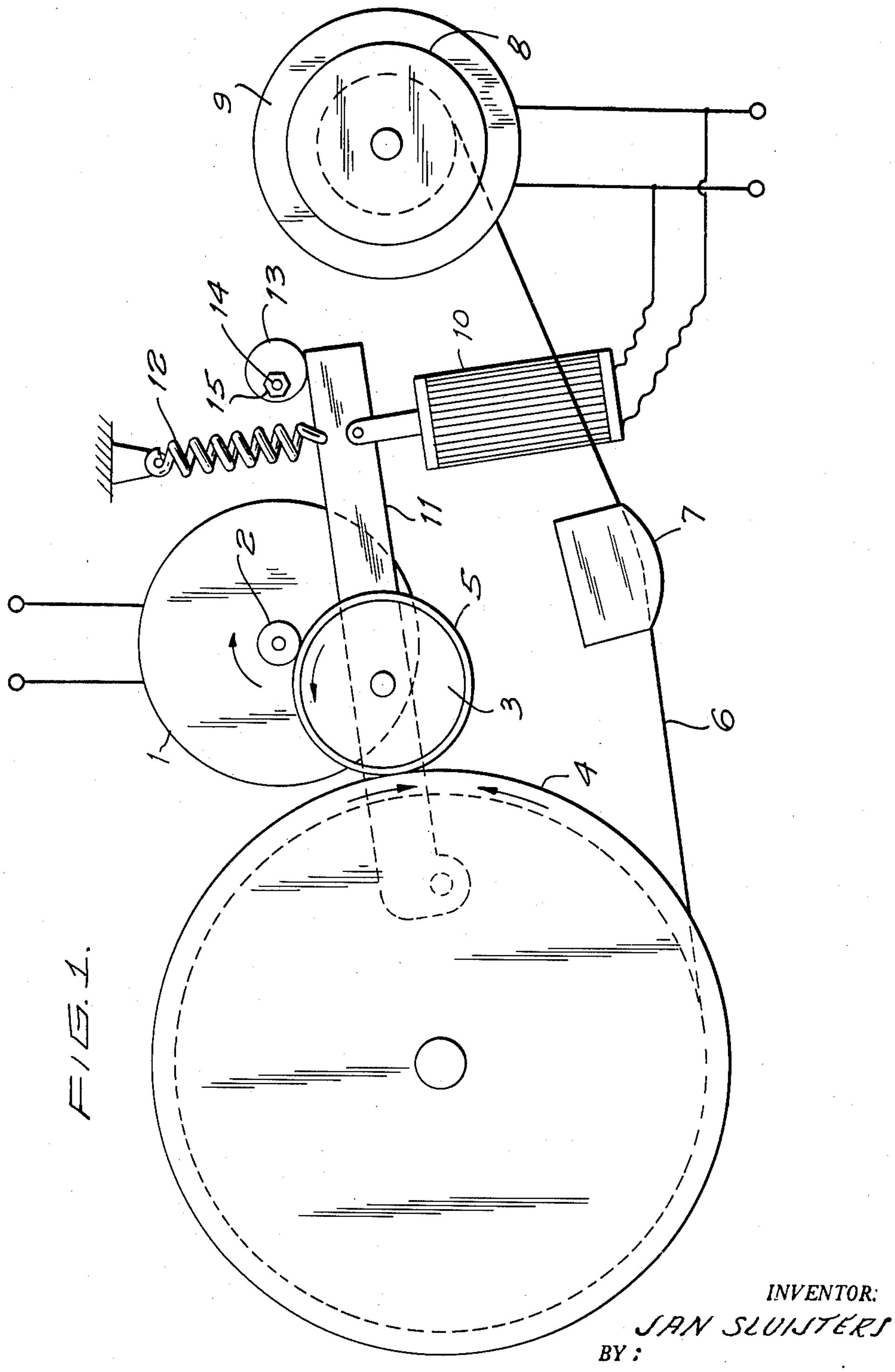
Figure 2:
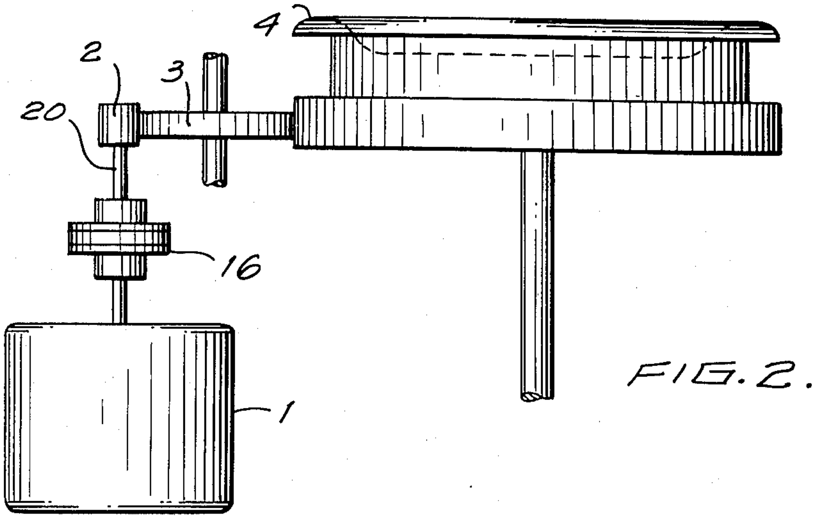
Figure 3:
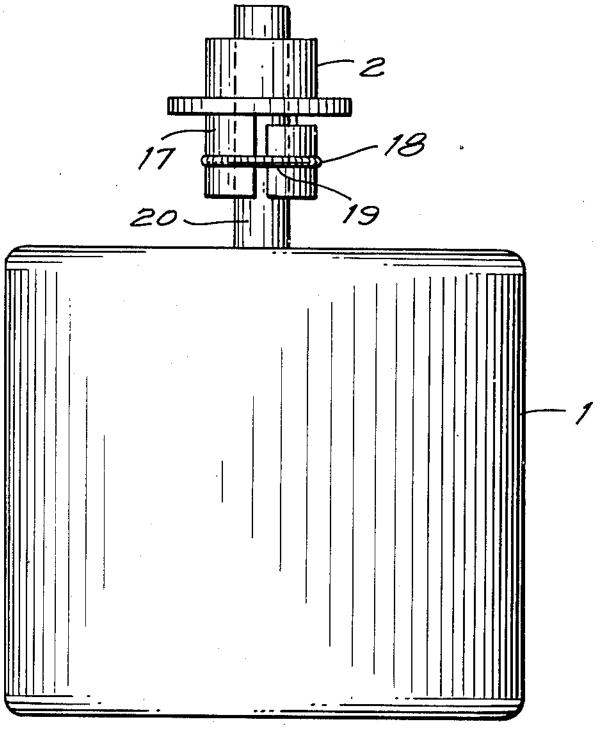

A further object is to avoid the wear of the parts of the driving mechanism on which the regular run of the reel depends. Further objects of my invention will be set out in the following description and illustrated by a drawing in which Figure 1 illustrates a conventional type of driving mechanism and Figures 2 and 3 illustrate my invention. In Figure 1, 1 is a motor driving the grooved disc 4 by means of a pulley 2 fixed to the shaft of the motor, and coupled with an intermediate wheel 3 coated with a rubber layer 5. During the recording and reproduction of sound, the wire 6 is wound into the groove of the disc 4 and thus led past the magnetic system 7 which provides for the translation of alternating currents of speech-frequency into magnetic field variations and for the reverse during reproduction. The supply reel is mounted on the shaft of a second motor 9 which is excited only during the spooling back of the wire. Connected in parallel with the motor 9 is a coil of an electromagnetic device 10, which is therefore excited simultaneously with the switching on of the motor for the spooling back, and then draws away the arm 11, in which the intermediate wheel 3 is supported, against the action of a spiral spring 12 until the intermediate wheel 3 is disengaged from the pulley 2 and the disc 4. The latter disc is then free to rotate in the opposite direction, while the motor 1 rotates freely. If then the current supplied to the motor 9 and the magnet coil of 10 is interrupted, the spiral spring 12 will suddenly pull the intermediate wheel 3 against the pulley 2 and the disc 4 again. This disc, however, owing to the kinetic energy of the disc itself and of the motor 9 for the spooling back, will at that moment still rotate in the opposite direction to that in which the motor is trying to force the disc via the intermediate wheel. In consequence of this, the rubber intermediate wheel exerts a considerable braking effect on the disc and the latter is soon stopped, after which the direction of rotation is reversed.

The braking involves considerable wear of the rubber coating of the intermediate wheel, while also the instantaneous pull exerted on the recording wire may come dangerously near breaking point. In the conventional type, a safety device has therefore been included in the form of an eccentric disc 13, which rotates about a pin 14 and can be splined by means of a nut 15. This disc acts as a stop which limits the movement of the intermediate wheel in the direction of the pulley 2 and the disc 4, and consequently the friction of the intermediate wheel in relation to the pulley and the disc.

The adjustment of this stop, is, however, extremely critical, and is also to be periodically repeated as the intermediate wheel wears out, so as to prevent slip during normal operation.

The invention provides an improved construction, which makes this critical adjustment superfluous. It is based on the insight that the intermediate wheel should serve exclusively for the transmission of the driving force of the motor 1 to the disc 4, and should not also be used for the braking of this disc.

As however a brake is necessary to stop the rotation of the take-up-reel, and on the other hand excessive stress on the wire is to be avoided, a slip-coupling between the shaft of the driving motor and the ultimate wheel of the transmission which drives the wheel fixed on the shaft carrying the reel is introduced.

In carrying out this construction the frictional forces working on the intermediate wheel or wheels can easily be prevented to become so large as to cause slip between the intermediate wheel or wheels and the adjacent parts of the mechanism. As under these circumstances the coating of the wheels is not subject to wear, the repeated adjustment of the mentioned safety device is superfluous. In Figures 2 and 3 said slip-coupling is arranged between the shaft of the driving motor 1 and the pulley 2, and constitutes a separate and speciallly designed member. Here, the pulley 2 is no longer driven immediately by the shaft of the motor, but an appropriate friction coupling 16 has been inserted. The friction thus produced is sufficient to cause the pulley to rotate without slip, if it is in normal engagement with the intermediate wheel 3. However, the friction coupling 16 will slip, if the pulley meets with a considerably greater resistance, as is the case during the reversal—referred to above—of the direction of rotation after the spooling back.

After the destruction of the kinetic energy from the disc 4, the supply reel 8, and the rotor of the motor 9 for the spooling back—as illustrated in Figure 1—in the friction coupling, this coupling will stop slipping and the normal drive is resumed by the motor 1.

Any design of the friction coupling which has the friction value required to attain the end in view is suitable. In practice it has been found that a cheap and reliable coupling can be designed in accordance with Figure 3. Here, the pulley driving the intermediate wheel has been provided with an extension 17. The pulley has a bore of such a diameter that it can rotate lightly about the shaft of the motor while otherwise closely fitting around it. The extension 17, through which this bore also extends, is provided with two narrow saw cuts. One of these separates the extension from the pulley through part of the circumference. The other cut runs in the direction of the shaft and ends in the first at its beginning. The pulley with the extension is made of slightly elastic material, for example vulcanized fibre or ebonite. Owing to the presence of the saw cuts, part of the circumference of the extension has become somewhat mobile. By means of an annular spring 18, lying in a groove 19, this mobile part is forced against the shaft of the motor, thus producing the desired friction.

Instead of the special construction illustrated in Figure 3, other embodiments of the principle underlying this embodiment can readily be conceived. The principal feature is that the pulley consists of two parts, one with a bore fitting accurately on the shaft of the motor in which bore the shaft can rotate lightly whereas the other forms an extension of the first part and is provided with one or more friction members which can be pressed radially against the shaft so as to regulate the frictional force.

What I claim is:

1. Winding mechanism for an electromagnetic sound recording and reproducing apparatus, comprising, in combination, a first rotatable winding reel on which an elongated magnetic sound record carrier is wound; a second rotatable winding reel arranged spaced from said first winding reel on which said elongated magnetic sound record carrier is adapted to be wound up from said first winding reel and vice versa; first motor means for rotating said second winding reel whenever desired; a first rotatable turning member mounted for engagement with said first winding reel for rotating the same; a second rotatable turning member adapted to be engaged by said first rotatable turning member for rotating the same; spring means permanently urging said first turning member toward said second turning member and into engagement with the latter; electromagnetic operating means actuated simultaneously with said first motor means during operation thereof so as to move during such operation said first rotatable turning member away from said second rotatable turning member out of engagement with the same; second motor means; motion transmitting means interconnecting said second motor means with said second rotatable turning member; and a friction slip coupling forming part of said motion transmitting means.

2. Apparatus as defined in claim 1, wherein said first rotatable turning member is frictionally engaged with said first winding reel, said second rotatable turning member is frictionally engaged with said first rotatable turning member, said spring means permanently urges said first turning member into engagement with said first winding reel and with said second turning member, and said electromagnetic operating means keeps said first rotatable turning member away from said first winding reel and from said second rotatable turning member during the operation of said electromagnetic operating means.

References Cited in the file of this patent

UNITED STATES PATENTS

| | | |
|---|---|---|
| 201,414 | Hastings | Mar. 19, 1878 |
| 441,714 | Stone | Dec. 2, 1890 |
| 2,199,999 | Jensen et al. | May 7, 1940 |
| 2,235,245 | Anderson et al. | Mar. 18, 1941 |
| 2,304,913 | Herzig | Dec. 15, 1942 |
| 2,504,587 | Rey | Apr. 18, 1950 |
| 2,552,682 | Lopez | May 15, 1951 |
| 2,561,602 | Valentino et al. | July 24, 1951 |
| 2,614,760 | Danisch | Oct. 21, 1952 |

FOREIGN PATENTS

| | | |
|---|---|---|
| 766,986 | France | Apr. 23, 1934 |
| 472,768 | Great Britain | Sept. 30, 1937 |